(12) United States Patent
Zhang et al.

(10) Patent No.: US 11,676,015 B2
(45) Date of Patent: Jun. 13, 2023

(54) PERSONALIZED RECOMMENDATIONS USING A TRANSFORMER NEURAL NETWORK

(71) Applicant: salesforce.com, inc., San Francisco, CA (US)

(72) Inventors: Arthur Zhang, Cambridge, MA (US); Joshua Correa, Arlington, MA (US)

(73) Assignee: Salesforce, Inc., San Francisco, CA (US)

( * ) Notice: Subject to any disclaimer, the term of this patent is extended or adjusted under 35 U.S.C. 154(b) by 385 days.

(21) Appl. No.: 16/886,470

(22) Filed: May 28, 2020

(65) Prior Publication Data
US 2021/0374520 A1    Dec. 2, 2021

(51) Int. Cl.
*G06N 3/08*     (2023.01)
*G06N 20/20*    (2019.01)
*G06Q 30/0601*  (2023.01)
*G06N 7/01*     (2023.01)

(52) U.S. Cl.
CPC ........... *G06N 3/08* (2013.01); *G06N 7/01* (2023.01); *G06N 20/20* (2019.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 2007/0016553 | A1* | 1/2007 | Dumais | H04L 67/535 |
| 2010/0076857 | A1* | 3/2010 | Deo | H04L 67/535 |
| | | | | 705/26.1 |
| 2014/0180760 | A1* | 6/2014 | Karatzoglou | G06Q 30/0269 |
| | | | | 705/7.29 |
| 2016/0299992 | A1* | 10/2016 | Cetintas | G06F 16/951 |

(Continued)

FOREIGN PATENT DOCUMENTS

WO    WO-2018098598 A1 *  6/2018  ........... G06K 9/6256

OTHER PUBLICATIONS

Giovanni Recommendations with neural networks), Jan. 2019, pp. 1-21 (Year: 2019).*

(Continued)

*Primary Examiner* — Romain Jeanty
(74) *Attorney, Agent, or Firm* — Butzel Long

(57) ABSTRACT

Systems, devices, and techniques are disclosed for recommendations using a transformer neural network. User activity data including items and actions associated with users and a catalog including descriptions of the items may be received. User vectors for the users, item vectors for the items and action vectors the actions may be generated by applying singular vector decomposition to the user activity data. Sequence vectors may be generated based on item vectors and the action vectors. Transformer vectors may be generated by applying a text-to-text transferring transformer to descriptions of the items. Similarity vectors may be generated based on the transformer vectors. Merged vectors may be generated by merging the sequence vector, trans- (Continued)

former vector, and similarity vector for items. A set of probabilities may be determined by inputting the user vector for the user, merged vectors for the items, and sequence vectors for the actions to a transformer neural network.

20 Claims, 13 Drawing Sheets

(56) References Cited

U.S. PATENT DOCUMENTS

2017/0140261 A1* 5/2017 Qamar .................. G06F 16/245
2018/0285827 A1* 10/2018 Dotan-Cohen ...... G06Q 10/063

OTHER PUBLICATIONS

Libo et al (A Recommendation Model Based on Deep Neural Network), Nov. 2017, IEEE Access, pp. 9454-9463.*
Raffel, et al., "Exploring the Limits of Transfer Learning with a Unified Text-to-Text Transformer," arXiv:1910.10683v2 [cs.LG], Oct. 24, 2019, 53 pages.
Bachlechner, et al., "ReZero is All You Need: Fast Convergence at Large Depth," arXiv:2003.04887v1 [cs.LG] Mar. 10, 2020, 11 pages.
Srivastava, et al., "Highway Networks," arXiv:1505.00387v2 [cs.LG] Nov. 3, 2015, 6 pages.

* cited by examiner

PERSONALIZED RECOMMENDATIONS USING A TRANSFORMER NEURAL NETWORK

BACKGROUND

Recommendation systems for products use a user's past behavior to determine what products to recommend to the user in order to induce the user to purchase, or take some other action, in relation to the product. Various algorithms exist for use in recommendation systems, including singular value decomposition (SVD) algorithms and bandit algorithms. Recommending products determined by these recommendation systems for users may not result in the desired actions from the users, as the recommendations may not be personalized enough on a per user basis.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
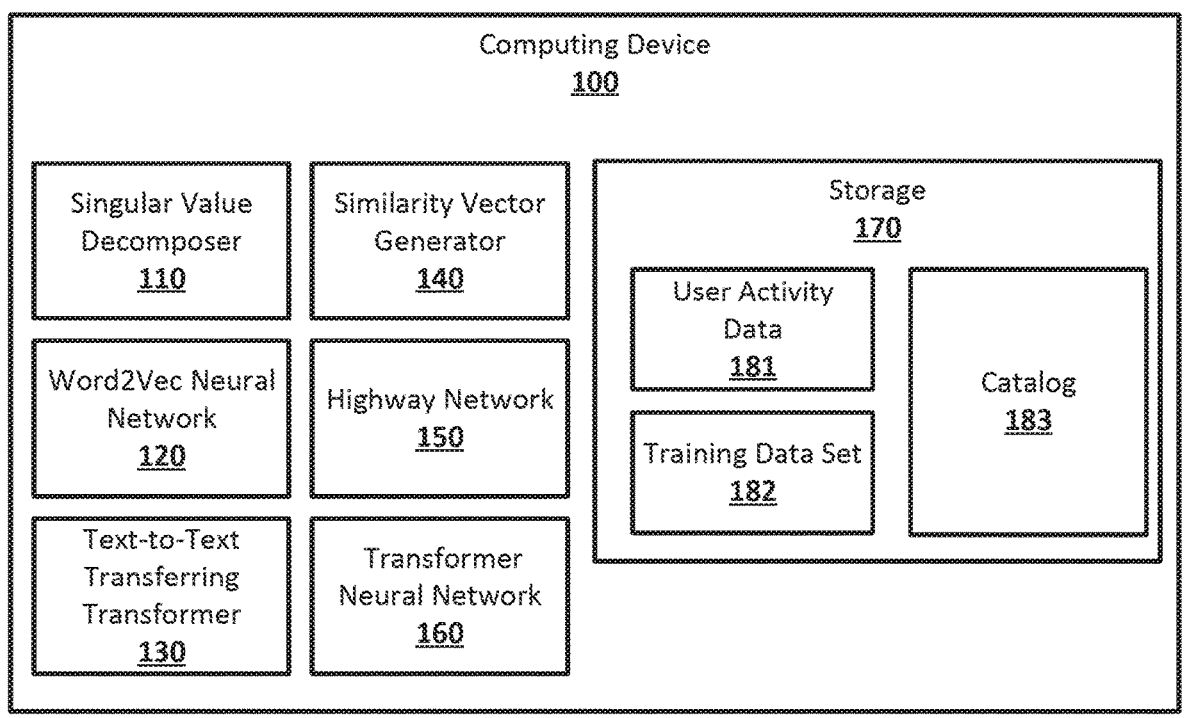
FIG. 1 shows an example system for suitable for personalized recommendations using a transformer neural network according to an implementation of the disclosed subject matter.

Techniques disclosed herein enable personalized recommendations using a transformer neural network, which may allow for a transformer neural network to be trained to generate personalized recommendations for user's based on user activity data. User activity data that includes items and actions associated with users may be received along with catalog that includes descriptions of the items in the user activity data. Singular vector decomposition may be applied to the user activity data to generate a user vector for each of the users, an item vector for each item, and an action vector for each action associated with the users. A word2vec neural network may be applied to the item vectors and the action vectors to generate sequence vectors. A text-to-text transferring transformer may be applied to the description of the items from the catalog to generate a transformer vector for each of the items. A pairwise similarity matrix may be determined using the transformer vectors to generate similarity vectors for each of the items. A highway network may be used to generate merged vectors for each of the items by merging the sequence vector, transformer vector, and similarity vector for each item. The user vectors, merged vectors for each of the items and sequence vectors for each of the actions may be used to train a transformer neural network. A set of probabilities may be determined for individual users by inputting the user vector for the user, merged vectors for each of the items, and action vectors to the transformer neural network. The set of probabilities for a user may include a probability for each item that has a description in the catalog. The probability for an item may indicate the likelihood of the user taking an action in regard to that item if that item is recommended to the user User activity data that includes items and actions associated with users and catalog that includes descriptions of the items in the user activity data may be received from any suitable source and may be in any suitable format. The user activity data may include the history of users' interactions with items and actions related to the items. The items may be, for example, products. The user activity data for a user may include a list of the items that a user has interacted with through actions, and a list of the actions taken by the user. The actions may be, for example, related to the purchasing of the products, including, for example, submitting a search query to an online store that returns a webpage for a product as a result, viewing a webpage for a product, using any form of electronic communication to inquire or ask questions about a product, placing a product in a shopping cart of an online store, and purchasing a product from the online store.

The catalog may include entries for each of the items in the user activity data. The entry for an item in the catalog may include a description of the item. The description may be unstructured or semi-structured natural language stored in any suitable format, such as, for example, HTML or XML. For example, a catalog entry for a shirt may include a product name for the shirt, a text description of the shirt that may be the result of copywriting, and various measurements for the shirt. The catalog may be, for example a catalog of the products.

Singular vector decomposition (SVD) may be applied to the user activity data to generate a user vector for each of the users, an item vector for each item, and an action vector for each action associated with the users. A matrix representing the user activity data may be generated by counting the items interacted with and actions taken by each user from the user activity data. The matrix representing the user activity data may be two dimensional and of size n×m, where n may be the number of users in the user activity data and m may be the number of items plus the number of actions from the user activity data. A matrix factorization algorithm may be applied to the matrix that represents the user activity data. The matrix factorization algorithm may be low-rank based, for example, a matrix factorization algorithm that uses a minimal number of hidden states to represent the user behavior pattern and the item characteristics. The default rank may be K, which may be a number chosen to be small compared with n and m. The result of matrix factorization may be an inferred user matrix U which may be of dimensions n×K, and activity matrix P which may be of dimensions K×m.

Each row of the user matrix U may represent the behavior of a user from the user activity data, for example, which items the user interacted with and the degree of interaction, and the actions the user took. Each row of the activity matrix P may represent different aspects of an item or action from the user activity data. The rows of the user matrix U may be user vectors, with one user vector for each user in the user activity data. The rows of the activity matrix P for items may be item vectors, and the rows of the activity matrix P for actions may be action vectors, with one item vector for each item and one action vector for each action from the user activity data.

A word2vec neural network may be applied to the item vectors and the action vectors. The word2vec neural network may be a two-layer neural network. The item vectors and action vectors generated by singular value decomposition may be input individually to the word2vec neural network. The word2vec neural network may output a sequence vector for each item and action in the user activity data. The sequence vectors output by the word2vec neural network may be of any suitable dimension d2.

A text-to-text transferring transformer may be applied to the description of the items from the catalog to generate a transformer vector for each of the items. The description and images of an item from the entry for the item in the catalog may be encoded into a transformer vector using the text-to-text transferring transformer. The transformer vector may be of any suitable dimension. For example, the transformer vectors output by the text-to-text transferring transformer for each item from the user activity data may have a dimension of 300.

A pairwise similarity matrix may be determined using the transformer vectors to generate similarity vectors for each of the items. The pairwise similarity matrix may be determined based on transformer vectors generated for each item in the user activity data by the text-to-text transferring transformer. The pairwise similarity matrix may be based on the computation of the pairwise distance between all of the transformer vectors. The pairwise similarity matrix may include similarity vectors for each item based on the pairwise distance between the transformer vector for that item and the transformer vectors for every other item. The number of elements in a similarity vector for an item may be large, and may be reduced by taking some number d3, which may be, for example, 50, of the top principal components of the similarity vector, resulting in the similarity vectors all having the dimension d3.

A highway network may be used to generate merged vectors for each of the items by merging the item vector, transformer vector, and similarity vector for each item. The highway network may be any suitable neural network structure that may use gates to control data flow between layers of the neural network and drop out data from input vectors when generating an output vector. Each item from the user activity data may be represented by a sequence vector generated from the item vector for the item, a transformer vector generated from description of the item in the catalog, and a similarity vector generated from the transformer vector. The sequence vector, transformer vector, and similarity vector for an item may be input to the highway network. The highway network may take a portion of each of the sequence vector, transformer vector, and similarity vector and send them directly to the output of the highway network. The remaining portions of sequence vector, transformer vector, and similarity vector may go through a rectifiable gate of the highway network, which may include a number of weighted gates, which may drop out some of the remaining portions, sending non-dropped out portions to the output of the highway network. The output of the highway network may be a merged vector for the item that may have any suitable dimension, such as, for example, the same dimension as the sequence vector, and may include portions of the item vector, transformer vector, and similarity vector. The highway network may have been trained in any suitable manner to set the weights of the weighted gates.

The user vectors, merged vectors for each of the items and sequence vectors for each of the actions may be used to train a transformer neural network. The transformer neural network may be any suitable type of transformer neural network, such as, for example, a rezero-based transformer neural network. The transformer neural network may be trained in any suitable manner, including, for example, through offline supervised learning. During training of the transformer neural network, all of the user vectors may be input to the transformer neural network first, before the merged vectors and sequence vectors for the actions are input.

A set of probabilities may be determined for individual users by inputting the user vector, merged vectors for each of the items, and sequence vectors for each of the actions to the transformer neural network. The user vector may be input to the transformer neural network first, before the merged vectors and sequence vectors for the actions are input. The last layer of the transformed neural network may filter out the probabilities determined for the actions from the user activity data, so that the set of probabilities for the user includes a probability for each item that has a description in the catalog. The probability for an item may indicate the likelihood of the user's taking an action in regard to that item if that item is recommended to the user.

A user vector may be created for a new user who has no data in the user activity data. When a new user has no data in the user activity data, the new user may not have had a user vector generated from the user activity data. To determine a set of probabilities for a new user who has no user activity data and no user vector, a user vector may be created for the new user by averaging the user vectors that were created when SVD was applied to the user activity data. The user vector for the new user may then be input to the transformer neural network to generate a set of probabilities for the new user. The user vector for the new user may be replaced with a user vector generated based on the user's activity, including interaction with items and actions, when the user has a longer history of activity.

A user vector may be created for a new user who has some data in the user activity data, but does not have a user vector. A new user may have a smaller amount of the data in the user activity data, for example, when the user is relatively new but has had some interactions with items in the user activity data. A user vector may not have been generated for the new user when the user vectors were generated from the user activity data, so such a user vector for the user vector would not have been among the user vectors that were input to the transformer neural network during training of the transformer neural network. A user-to-user similarity comparison may be performed between the data in the user activity data for the new user and the data in the user activity data for all other users to determine which users the new user is most similar to. User vectors for some number, for example, 20, of the users to whom the new user is most similar may be used to generate a user vector for the new user, for example, through averaging of the user vectors. The user vector for the new user may then be input to the transformer neural network to generate a set of probabilities for the new user. The user vector for the new user may be replaced with a user vector generated based on the user's activity, including interaction with items and actions, when the user has a longer history of activity.

An item vector may be created for an item that has no data in the user activity data. When a new item is added to the catalog, that item may not have any data in the user activity data, as the item may not have been available for interaction with by users before being put into the catalog. For example, a new product added to an online store may not have been viewed or purchased by any users, as it may not have been available before being added to the online store. An item vector for the new item may be created by averaging the item vectors that were generated for the items from the user activity data. The item vector for the new item may be used to generate a merged vector for the item. The new item vector may be replaced with an item vector generated based on interactions with the item by user's when the item has a longer history of being interacted with.

FIG. 1 shows an example system for suitable for personalized recommendations using a transformer neural network according to an implementation of the disclosed subject matter. A computing device 100 may be any suitable computing device, such as, for example, a computer 20 as described in FIG. 12, or component thereof, for implementing personalized recommendations using a transformer neural network. The computing device 100 may include a singular value decomposer 110, a word2vec neural network 120, a text-to-text transferring transformer 130, a similarity vector generator 140, a highway network 150, a transformer neural network 160, and a storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The singular value decomposer 110 may be any suitable combination of hardware and software of the computing device 100 for performing singular value decomposition on data such as, for example, user activity data 181. The singular value decomposer 110 may, for example, apply SVD to the user activity data 181 to a generate user vector for each of the users, an item vector for each item, and an action vector for each action associated with the users. The user activity data 181 may include a history of users' interactions with a number of items from a catalog 183, including actions taken by the users with regard to the items. The singular value decomposer 110 may generate a matrix representing the user activity data 181 by counting the items interacted with and actions taken by each user from the user activity data 181. The matrix representing the user activity data 181 may be two dimensional and of size n×m, where n may be the number of users in the user activity data and m may be the number of items plus the number of actions from the user activity data. The singular value decomposer 110 may apply a matrix factorization algorithm to the matrix that represents the user activity data 181. The matrix factorization algorithm may be low-rank based, for example, a matrix factorization algorithm that uses a minimal number of hidden states to represent the user behavior pattern and the item characteristics. The default rank may be K, which may be a number chosen to be small compared with n and m. The result of matrix factorization may be an inferred user matrix U which may be of dimensions n×K, and activity matrix P which may be of dimensions K×m. The rows of the user matrix U may be user vectors, with one user vector for each user in the user activity data 181. The rows of the activity matrix P for items may be item vectors, and the rows of the activity matrix P for actions may be action vectors, with one item vector for each item and one action vector for each action from the user activity data 181.

The word2vec neural network 120 may be any suitable combination of hardware and software of the computing device 100 for implementing a word2vec neural network. The word2vec neural network 120 may include, for example, a two-layer neural network trained on sequence data that may include sequences of user activity to generate sequence vectors based on the co-occurrence of items in the sequences of user activity. The item vectors and action vectors generated by the singular value decomposer 110 may be input to the word2vec neural network 120. The word2vec neural network 120 may output a sequence vector for each item and action from the user activity data 181 for which an item vector or action vector was generated. The sequence vectors output by the word2vec neural network may be of any suitable dimension d2.

The text-to-text transferring transformer 130 may be any suitable combination of hardware and software of the computing device 100 for implementing a text-to-text transferring transformer neural network. The text-to-text transferring transformer 130 may be a neural network for natural language processing that may be trained on a corpus of text and may generate vectors of text as output. The descriptions of the items from the catalog 183 may be input to the text-to-text transferring transformer 130, which may generate a transformer vector for each of the items. The description and images of an item from the entry for the item in the catalog may both be encoded into the transformer vector using the text-to-text transferring transformer 130. The transformer vector may be of any suitable dimension. For example, the transformer vectors output by the text-to-text transferring transformer 130 for each item from the user activity data may have a dimension of 300.

The similarity vector generator 140 may be any suitable combination of hardware and software of the computing device 100 for generating similarity vectors for the items from the user activity data 181. The similarity vector generator 130 may, for example, generate a pairwise similarity matrix based on the transformer vectors generated by the text-to-text transferring transformer 130. The pairwise similarity matrix may be based on the computation of the pairwise distance between all of the transformer vectors. The pairwise similarity matrix may include similarity vectors for each item based on the pairwise distance between the transformer vector for that item and the transformer vectors for every other item. The number of elements in a similarity vector for an item may be large, and may be reduced by taking some number d3, which may be, for example, 50, of the top principal components of the similarity vector, resulting in the similarity vectors all having the dimension d3.

The highway network 150 may be any suitable combination of hardware and software of the computing device 100 for implementing a highway network for merging vectors. The highway network 150 may be, for example, a neural network structure that may use gates to control data flow between layers of the neural network and drop out data from input vectors when generating an output vector. Each item from the user activity data 181 may be represented by a sequence vector generated from the item vector for the item by the word2vec neural network 120, a transformer vector generated by the text-to-text transferring transformer 130, and a similarity vector generated from the transformer vector by the similarity vector generator 140. The sequence vector, transformer vector, and similarity vector for an item may be input to the highway network 150. The highway network 150 may take a portion of each of the sequence vector, transformer vector, and similarity vector and send them directly to the output of the highway network 150. The remaining portions of sequence vector, transformer vector, and similarity vector may go through a rectifiable gate of the highway network 150, which may include a number of weighted gates, which may drop out some of the remaining portions, sending non-dropped out portions to the output of the highway network 150. The output of the highway network 150 may be a merged vector for the item that may have any suitable dimension, such as, for example, the same dimension as the sequence vector, and may include portions of the sequence vector, transformer vector, and similarity vector. The highway network 150 may have been trained in any suitable manner to set the weights of the weighted gates.

The transformer neural network 160 may be any suitable combination of hardware and software of the computing device 100 for implementing a transformer neural network that may generate sets of probabilities for users. The transformer neural network 160 may be a neural network structure for deep learning that may use a modified residual learning architecture. For example, the transformer neural network 160 may be a rezero-based transformer neural network, that when being trained, may be initialized acting as an identity function for the input with the layers all being multiplied by a parameters that starts at 0 for each layer. As the rezero-based transformer neural network is trained, the parameter for each layer may change. The user vectors, merged vectors for each of the items and sequence vectors for each of the actions may be stored in the storage 170 as part of a training data set 182, which may be used to train the transformer neural network 160. The transformer neural network 160 may be trained in any suitable manner, including, for example, through offline supervised learning. During training of the transformer neural network 160, all of the user vectors may be input to the transformer neural network first, before the merged vectors and sequence vectors for the actions are input.

The transformer neural network 160 may be used to generate a set of probabilities for individual users by inputting the user vector for a user, merged vectors for each of the items, and sequence vectors for each of the actions to the transformer neural network 160. The user vector for the user may be input to the transformer neural network first 160, before the merged vectors and sequence vectors for the actions are input. The last layer of the transformed neural network 160 may filter out the probabilities determined for the actions from the user activity data, so that the set of probabilities for the user includes a probability for each item that has a description in the catalog. The probability for an item may indicate the likelihood of the user taking an action in regard to that item if that item is recommended to the user.

The storage 170 may be any suitable combination of hardware and software for storing data. The storage 170 may include any suitable combination of volatile and non-volatile storage hardware, and may include components of the computing device 100 and hardware accessible to the computing device 100, for example, through wired and wireless direct or network connections. The storage 170 may store the user activity data 181, training data set 182, and the catalog 183. The user activity data 181 may be received from any suitable source, including from other components of the computing device 100, and from devices and systems outside of the computing device 100. For example, the user activity data 181 may be received from a database that stores user data for an online store hosted on the computing device 100 or on another computing device or server system. The catalog 183 may be received from any suitable source, including, for example, from a computing device or system that hosts the online store is related to an owner or proprietor of the online store.

Figure 2:
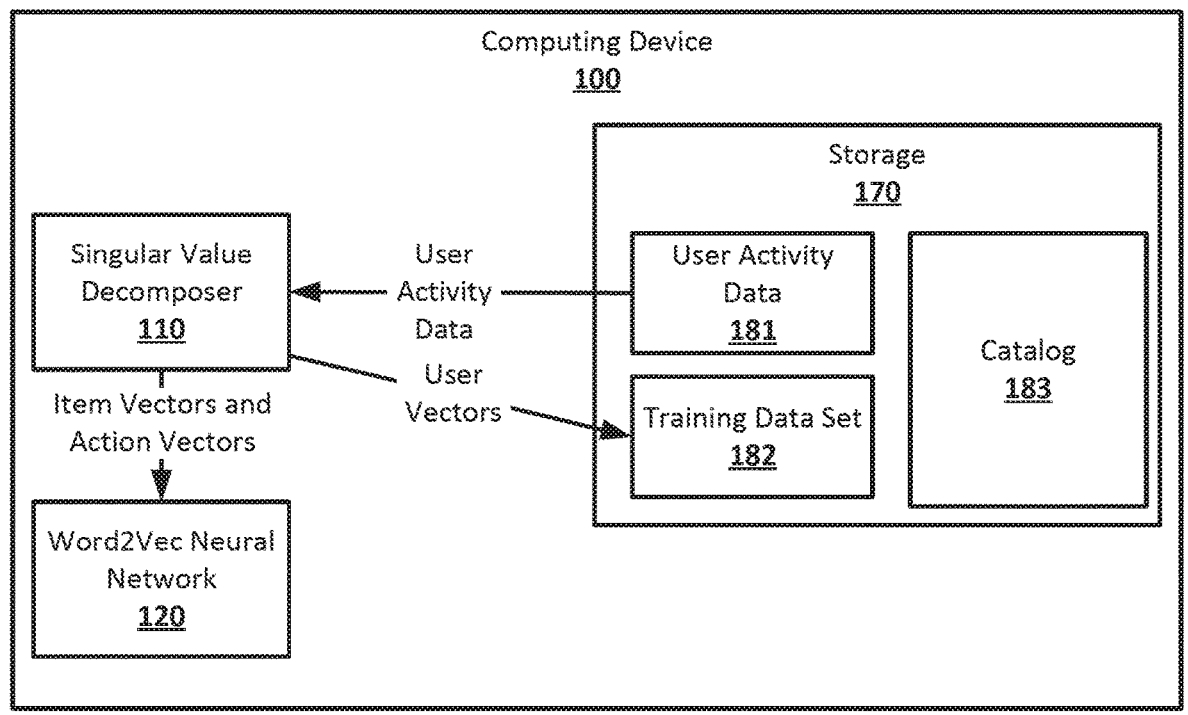
FIG. 2 shows an example arrangement suitable for personalized recommendations using a transformer neural network according to an implementation of the disclosed subject matter.

FIG. 2 shows an example arrangement for suitable for personalized recommendations using a transformer neural network according to an implementation of the disclosed subject matter. The user activity data 181 from the storage 170 may be input to the singular value decomposer 110. The singular value decomposer 110 may tokenize the user activity data 181 by applying SVD to the use activity data 181. The singular value decomposer 110 may generate a matrix representing the user activity data 181 by counting the items interacted with and actions taken by each user from the user activity data 181. The singular value decomposer 110 may apply a matrix factorization algorithm to the matrix that represents the user activity data 181. The matrix factorization algorithm may be low-rank based, for example, a matrix factorization algorithm that uses a minimal number of hidden states to represent the user behavior pattern and the item characteristics. The default rank may be K, which may be a number chosen to be small compared with n and m. The result of matrix factorization may be an inferred user matrix U which may be of dimensions n×K, and activity matrix P which may be of dimensions K×m. The rows of the user matrix U may be user vectors, with one user vector for each user in the user activity data 181. The user vectors may be stored as part of the training data set 182. The rows of the activity matrix P for items may be item vectors, and the rows of the activity matrix P for actions may be action vectors, with one item vector for each item and one action vector for each action from the user activity data 181. The item vectors and action vectors may be output to the word2vec neural network 120.

Figure 3:
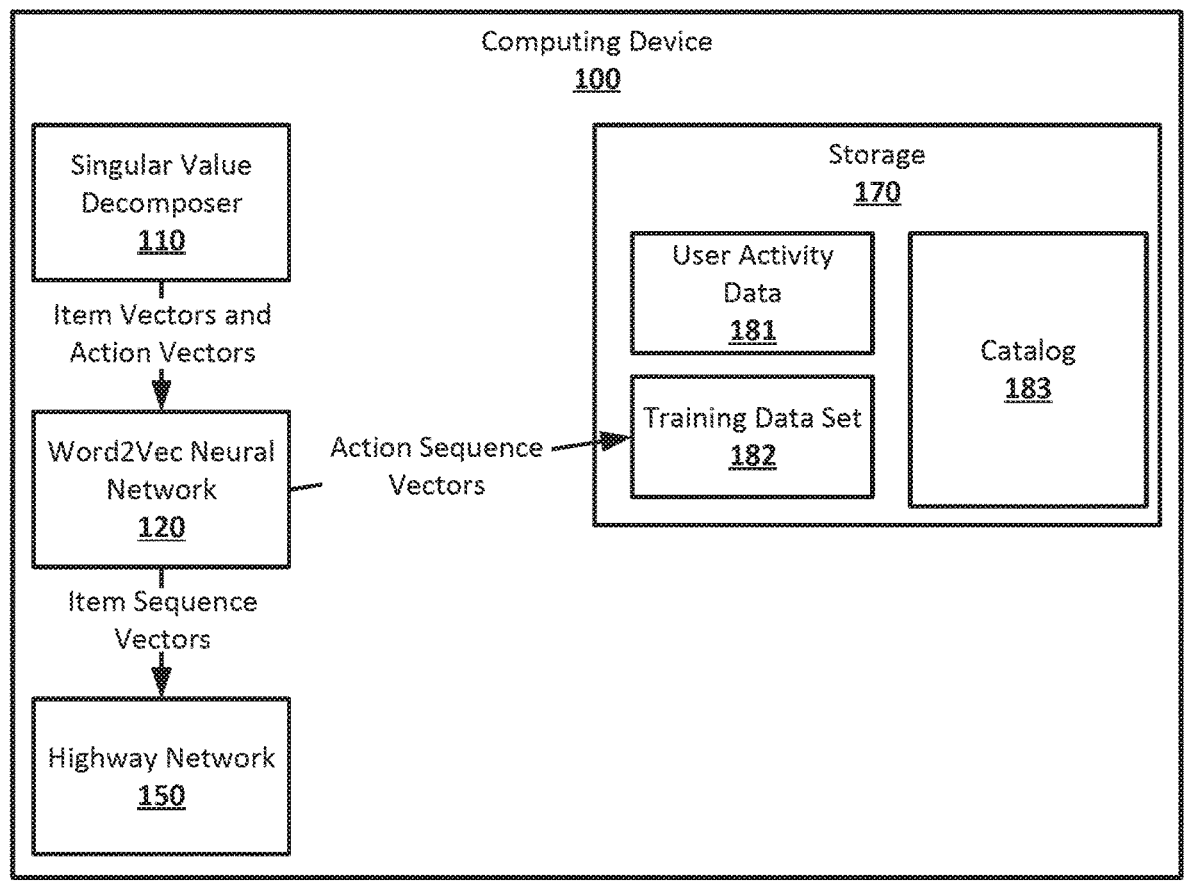
FIG. 3 shows an example arrangement suitable for personalized recommendations using a transformer neural network according to an implementation of the disclosed subject matter.

FIG. 3 shows an example arrangement for suitable for personalized recommendations using a transformer neural network according to an implementation of the disclosed subject matter. The item vectors and action vectors generated by the singular value decomposer 110 may be input to the word2vec neural network 120. The word2vec neural network 120 may output an item sequence vector for each input item vector and an action sequence vector for each input action vector. The sequence vectors output by the word2vec neural network may be of any suitable dimension d2. The item sequence vectors and action sequence vectors may be stored in the training data set 182. The item sequence vectors may also be output to the highway network 150, either directly from the word2vec neural network 130, or from the training data set 182.

Figure 4:
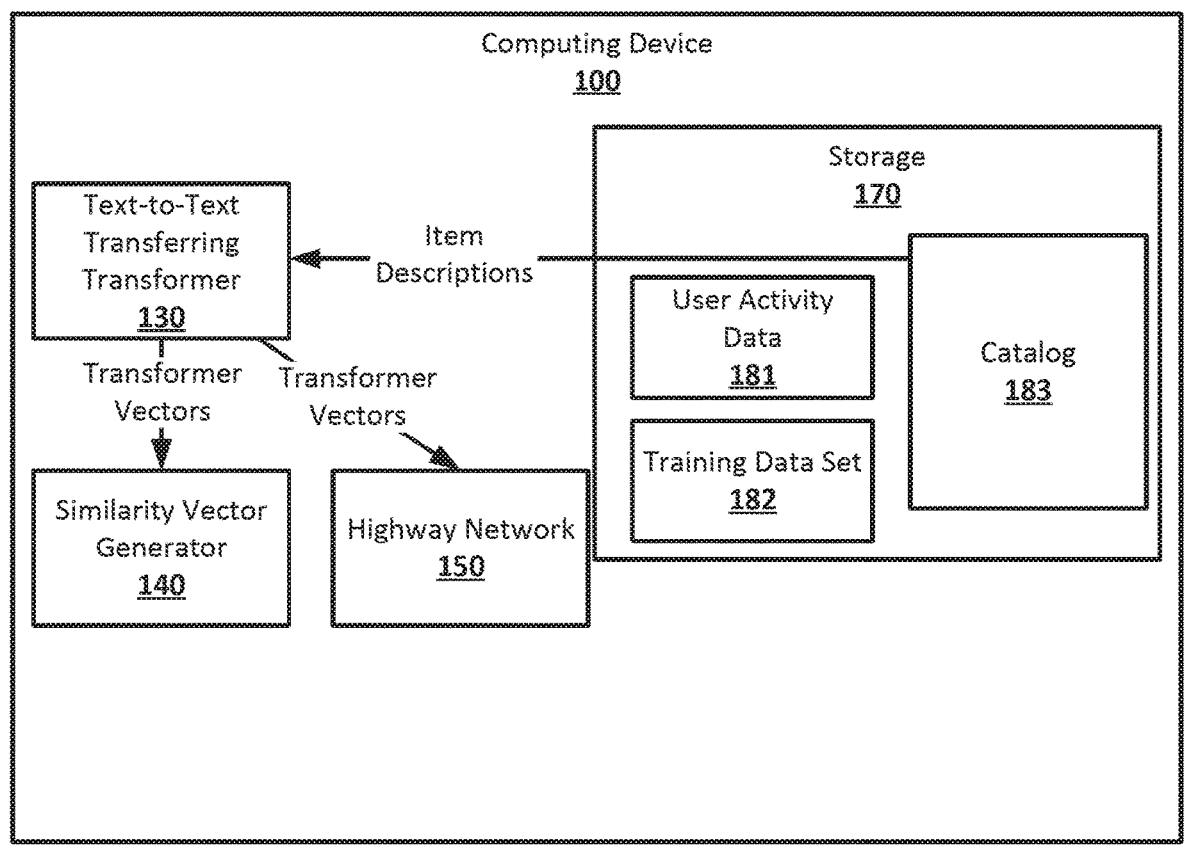
FIG. 4 shows an example arrangement suitable for personalized recommendations using a transformer neural network according to an implementation of the disclosed subject matter.

FIG. 4 shows an example arrangement for suitable for personalized recommendations using a transformer neural network according to an implementation of the disclosed subject matter. The descriptions of the items from the catalog 183 may be input to the text-to-text transferring transformer 130, which may generate a transformer vector for each of the items. The descriptions may be for the items that are included in the user activity data 181, and for which item vectors were generated by the singular value decomposer 110. The description and images of an item from the entry for the item in the catalog 183 may both be encoded into the transformer vector using the text-to-text transferring transformer 130. The transformer vector may be of any suitable dimension. For example, the transformer vectors output by the text-to-text transferring transformer 130 for each item from the user activity data 181 may have a dimension of 300. The transformer vectors output by the text-to-text transferring transformer 130 may be output to the highway network 150. The transformer vectors may also be output to the similarity vector generator 140, either directly from the text-to-text transferring transformer 130 or from the training data set 182.

Figure 5:
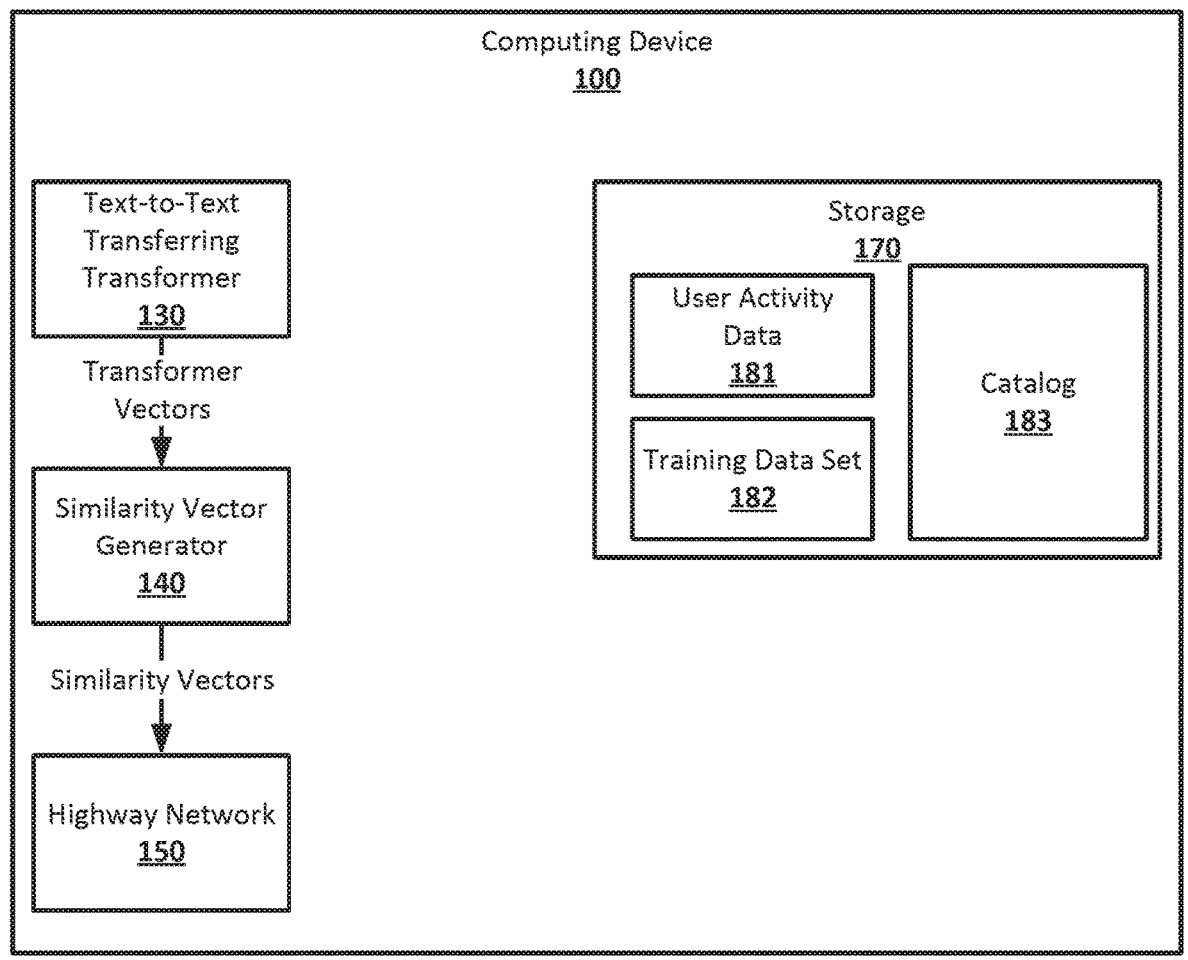
FIG. 5 shows an example arrangement suitable for personalized recommendations using a transformer neural network according to an implementation of the disclosed subject matter.

FIG. 5 shows an example arrangement for suitable for personalized recommendations using a transformer neural network according to an implementation of the disclosed subject matter. The similarity vector generator 130 may generate a pairwise similarity matrix based on the transformer vectors generated by the text-to-text transferring transformer 130. The pairwise similarity matrix may be based on the computation of the pairwise distance between all of the transformer vectors. The pairwise similarity matrix may include similarity vectors for each item based on the pairwise distance between the transformer vector for that item, as generated from the description of the item in the catalog 183, and the transformer vectors for all the other items. The number of elements in a similarity vector for an item may be large, and may be reduced by taking some number d3, which may be, for example, 50, of the top principal components of the similarity vector, resulting in the similarity vectors all having the dimension d3. The similarity vectors may be output to the highway network 150.

Figure 6:
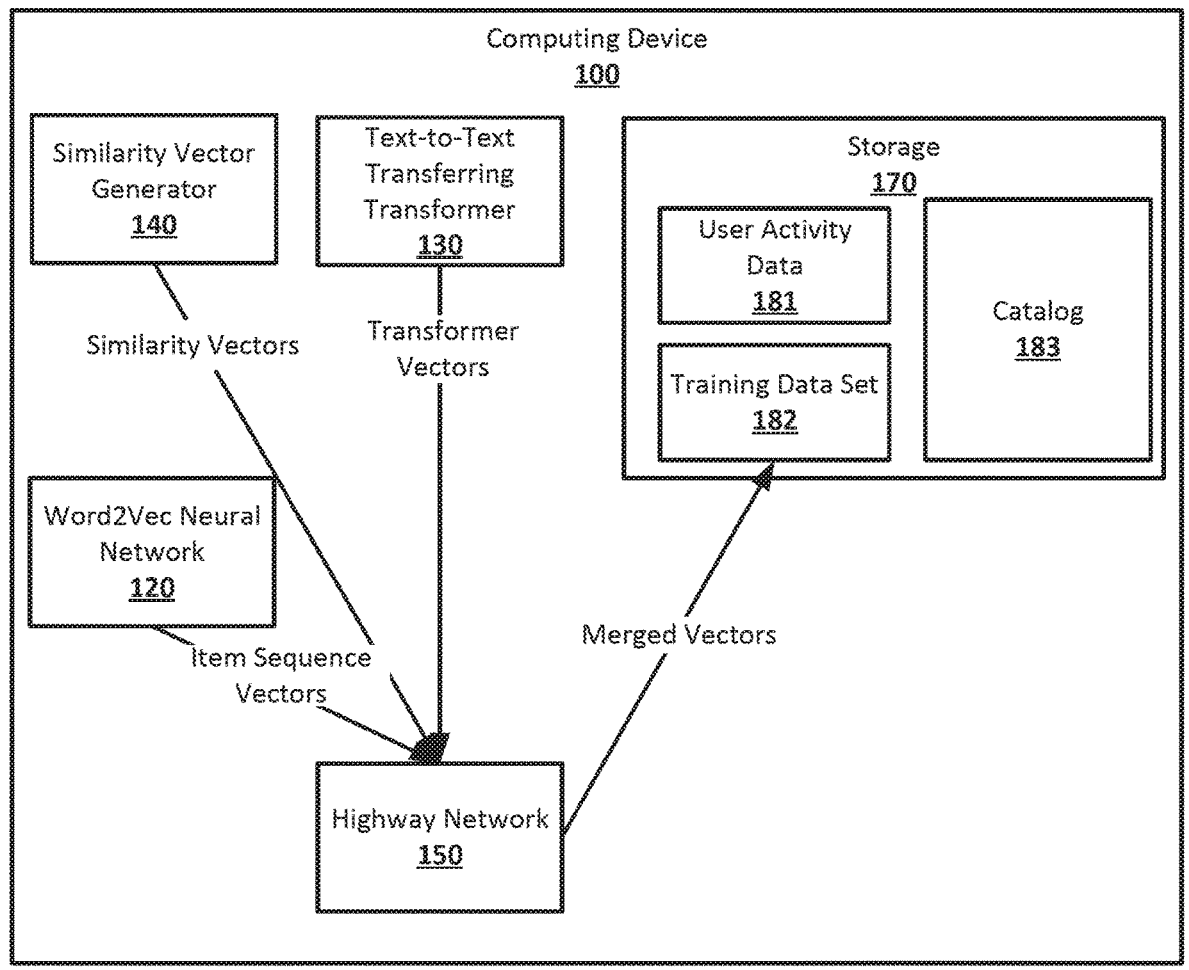
FIG. 6 shows an example arrangement suitable for personalized recommendations using a transformer neural network according to an implementation of the disclosed subject matter.

FIG. 6 shows an example arrangement for suitable for personalized recommendations using a transformer neural network according to an implementation of the disclosed subject matter. Each item from the user activity data 181 may be represented by a sequence vector generated from the item vector for the item by the word2vec neural network 120, a transformer vector generated by the text-to-text transferring transformer 130, and a similarity vector generated from the transformer vector by the similarity vector generator 140. The sequence vector, transformer vector, and similarity vector for an item may be input to the highway network 150. The highway network 150 may take a portion of each of the sequence vector, transformer vector, and similarity vector and send them directly to the output of the highway network 150. The remaining portions of sequence vector, transformer vector, and similarity vector may go through a rectifiable gate of the highway network 150, which may include a number of weighted gates, which may drop out some of the remaining portions, sending non-dropped out portions to the output of the highway network 150. The output of the highway network 150 may be a merged vector for the item that may have any suitable dimension, such as, for example, the same dimension as the sequence vector, and may include portions of the sequence vector, transformer vector, and similarity vector. The highway network 150 may receive as input the sequence vectors, similarity vectors, and transformer vectors, and may generate merged vectors for each item from the user activity data 181 with a sequence vector, similarity vector, and transformer vector. The merged vectors output by the highway network 150 may be stored in the training data set 182.

Figure 7:
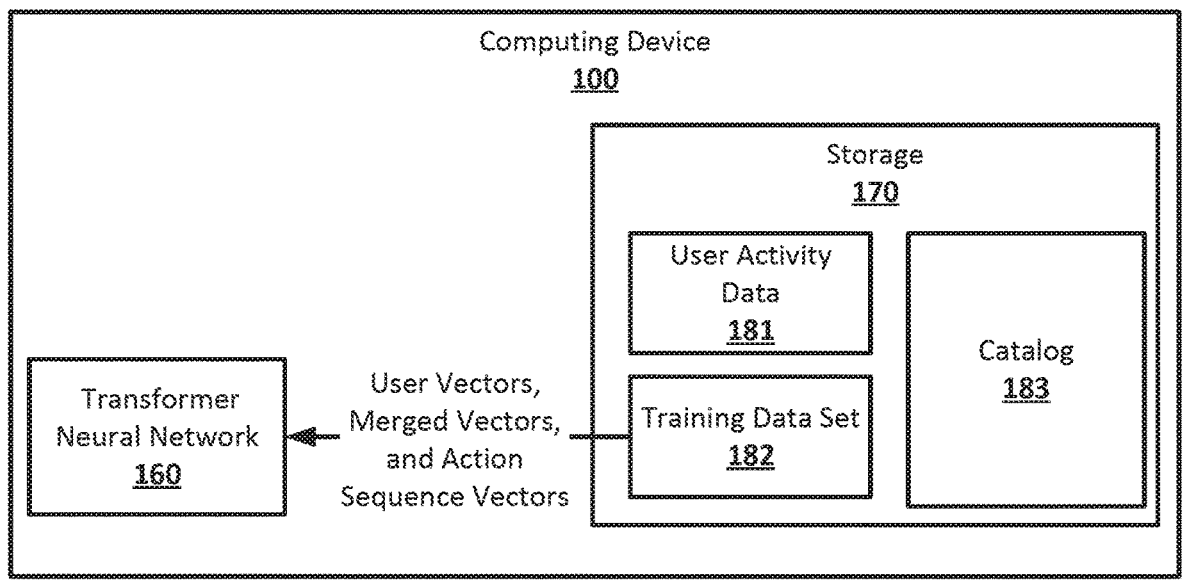
FIG. 7 shows an example arrangement suitable for personalized recommendations using a transformer neural network according to an implementation of the disclosed subject matter.

FIG. 7 shows an example arrangement for suitable for personalized recommendations using a transformer neural network according to an implementation of the disclosed subject matter. The transformer neural network 160 may be trained using the user vectors, merged vectors, and action sequence vectors from the training data set 182. For example, the transformer neural network 160 may be a rezero-based transformer neural network that may be initialized to act as an identity function for the input with the layers all being multiplied by a parameters that starts at 0 for each layer. As the rezero-based transformer neural network is trained using the user vectors, merged vectors, and action sequence vectors from the training data set 182, the parameter for each layer may change. The transformer neural network 160 may be trained in any suitable manner, including, for example, through offline supervised learning. During training of the transformer neural network 160, all of the user vectors may be input to the transformer neural network 160 first, before the merged vectors and sequence vectors for the actions are input.

Figure 8:
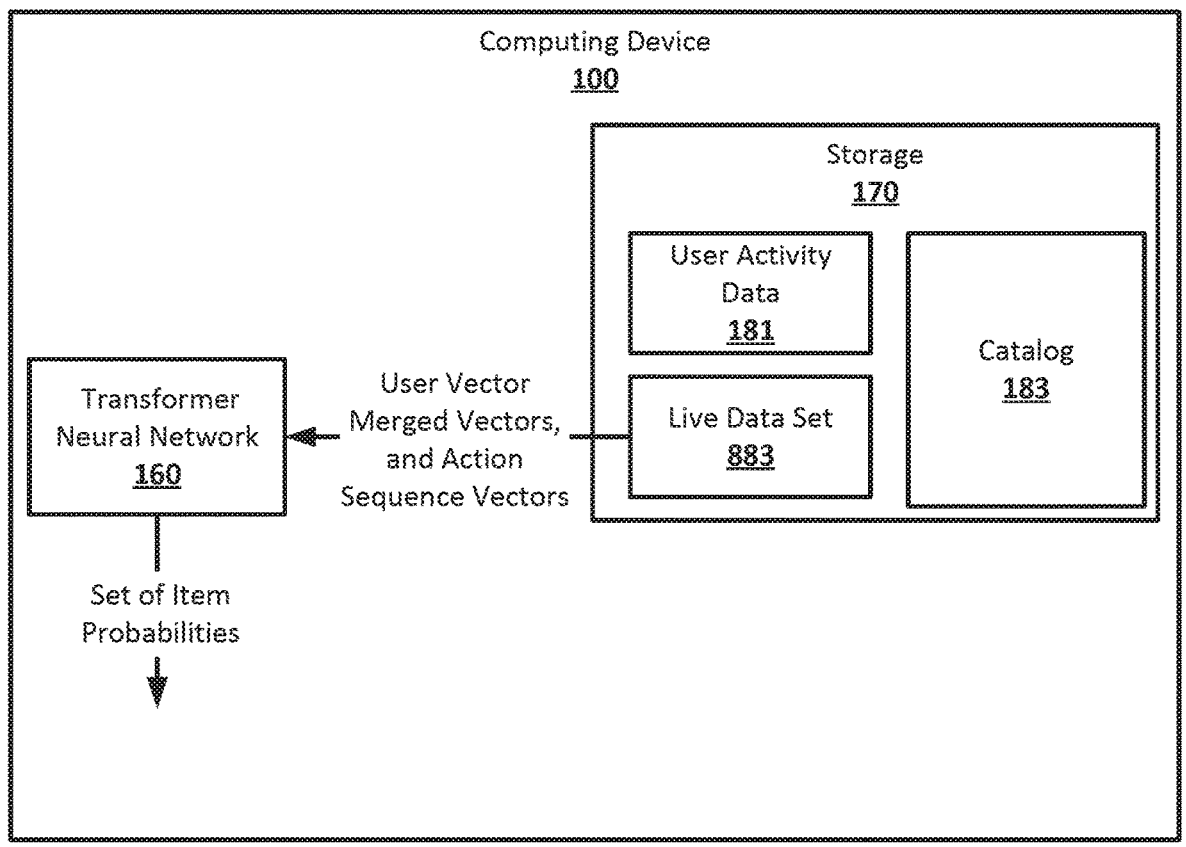
FIG. 8 shows an example arrangement suitable for personalized recommendations using a transformer neural network according to an implementation of the disclosed subject matter.

FIG. 8 shows an example arrangement for suitable for personalized recommendations using a transformer neural network according to an implementation of the disclosed subject matter. The transformer neural network 160 may be used to generate a set of probabilities for each of the items for an individual user. The user vector for a user, merged vectors for each of the items, and sequence vectors for each of the actions may be input to the transformer neural network 160. The user vector, merged vectors, and action sequence vectors may be input from a live data set 883. The live data set 883 may include the data from the training data set 182, and may include additional user vectors, merged vectors, and action sequence vectors that may have been generated after the training data set 182 was used to train the transformer neural network.

The user vector for the user may be input to the transformer neural network first 160, before the merged vectors and sequence vectors for the actions are input. The last layer of the transformed neural network 160 may filter out the probabilities determined for the actions from the user activity data, so that the set of probabilities for the user includes a probability for each item that has a description in the catalog. The probability for an item may indicate the likelihood of the user taking an action in regard to that item if that item is recommended to the user. The set of probabilities may be used in any suitable manner. For example, the set of probabilities may be used to make personalized item recommendations to the user. This may include, for example, generating and sending electronic communications, such as emails and SMS and MMS messages, that recommend the items with the highest probabilities for the user to the user. The items with the highest probabilities for the user may also be displayed to the user as recommendations when the user views a webpage of an online store in which the items are available, and may be included in advertising shown to the user on webpages outside of the online store. The items may be, for example, products or services that may be purchased or otherwise obtained by the user.

Figure 9A:
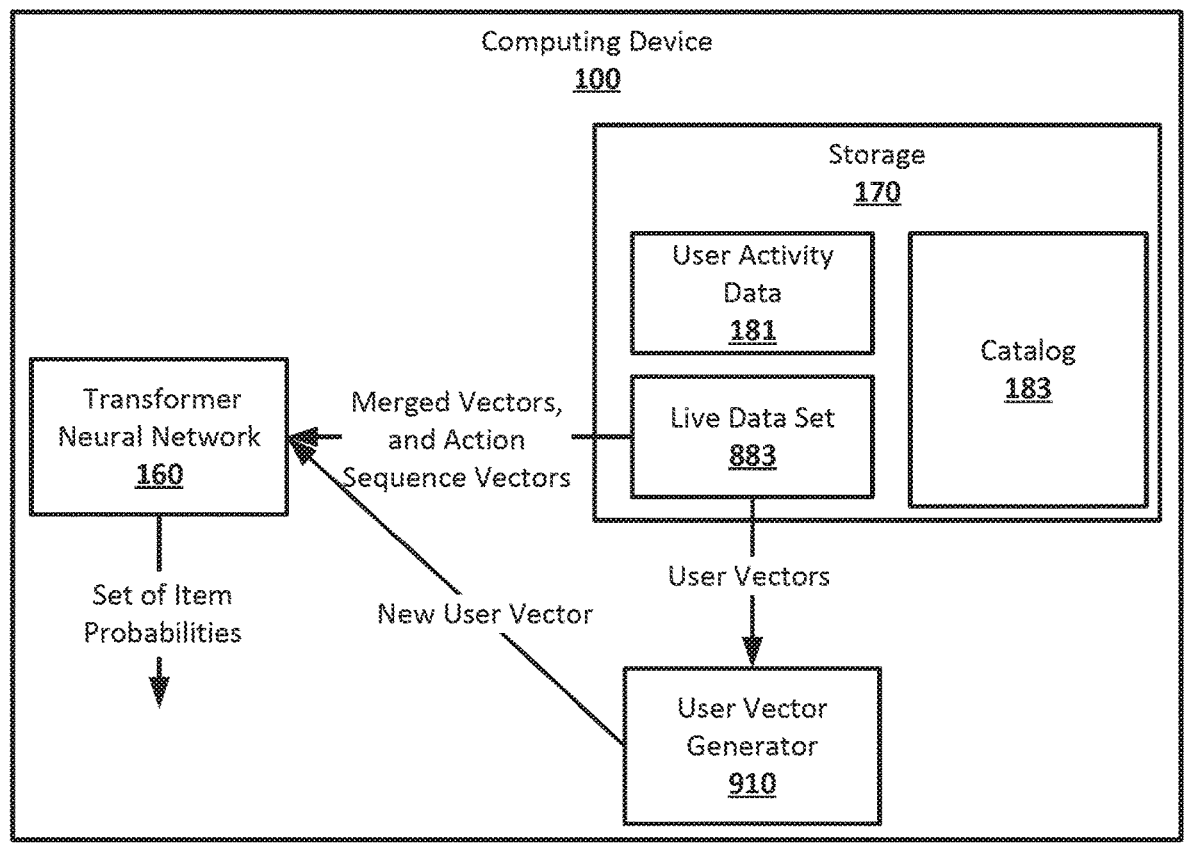
FIG. 9A shows an example procedure suitable for personalized recommendations using a transformer neural network according to an implementation of the disclosed subject matter.

FIG. 9A shows an example arrangement for suitable for personalized recommendations using a transformer neural network according to an implementation of the disclosed subject matter. A user vector may be generated for a new user who has no data in the user activity data 181, and did not have a user vector generated and stored in the training data set 191 or the live data set 883. For example, the new user may have registered a new account with an online store, but may not have not yet viewed any products in the online store. By generating a user vector for the new user, the transformer neural network 160 may be used to generate probabilities that may be used to determine what products to recommend to the new user when they start visiting webpages for products in the online store.

The computing device 100 may include a user vector generator 910. The user vector generator 900 may be any suitable combination of hardware and software for generating a user vector for a user who has no or little data in the user activity data 181. The user vector generator 900 may generate a user vector for a new user who has no data in the user activity data 181 by averaging the user vectors from the live data set 883, which may include the user vectors from the training data set 181. The user vector for the new user may then be input to the transformer neural network 160 along with the merged vectors and the action sequence vectors from the live data set 883 to generate a set of probabilities for all of the items for the new user.

Figure 9B:
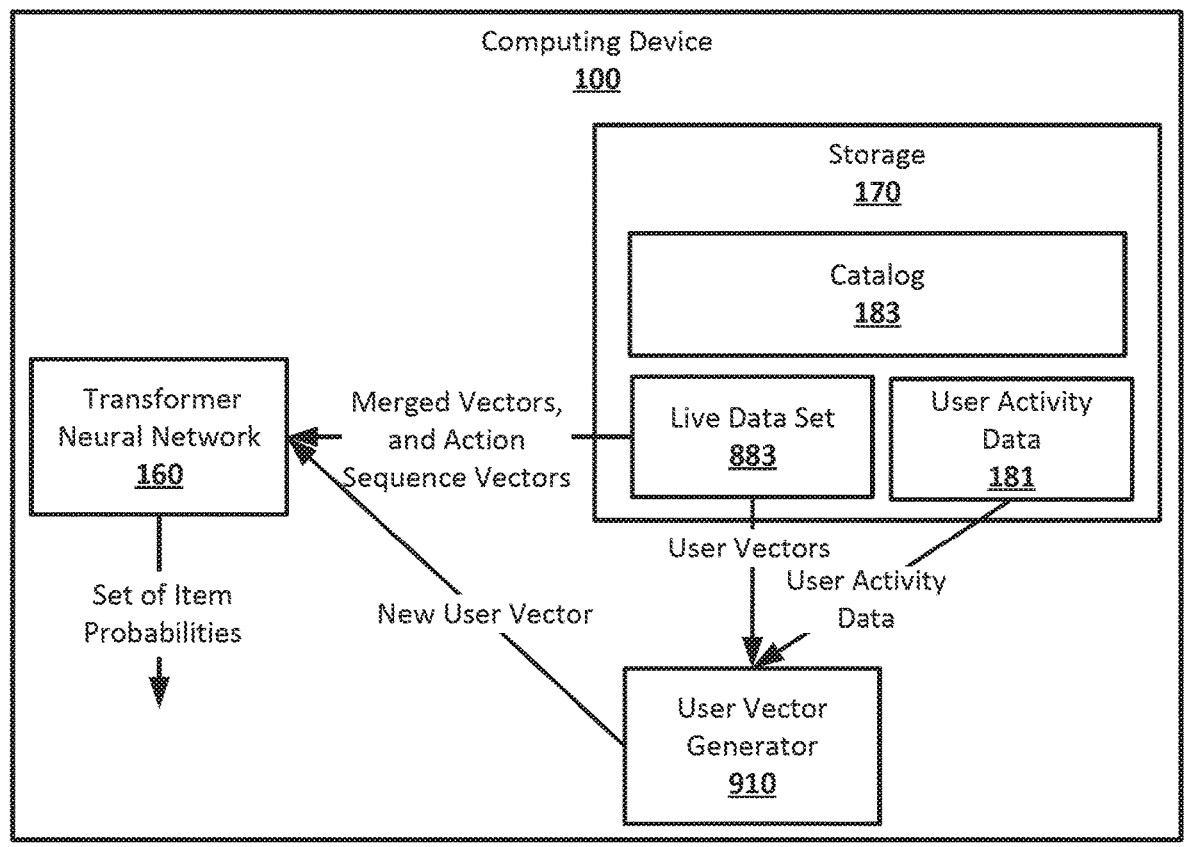
FIG. 9B shows an example procedure suitable for personalized recommendations using a transformer neural network according to an implementation of the disclosed subject matter.

FIG. 9B shows an example arrangement for suitable for personalized recommendations using a transformer neural network according to an implementation of the disclosed subject matter. A user vector may be created for a new user who has some data in the user activity data 181, but does not have a user vector. A new user may have a smaller amount of the data in the user activity data 181, for example, when the user is relatively new but has had some interactions with items in the user activity data 181, such as, for example, when a new user has used a new account for an online store to view a small number of products in the online store. The user vector generator 160 may receive the user vectors from the live data set 883 and the user activity data 181, including the activity data for the new user. The user vector generator 160 may perform a user-to-user similarity comparison between the activity data in the user activity data 181 for the new user and the activity data in the user activity data 181 for all other users to determine which users the new user is most similar to. The user vector generator 160 may use the user vectors from some number, for example, 20, of the users to whom the new user is most similar to generate a user vector for the new user, for example, through averaging of the user vectors. The user vector for the new user may then be input to the transformer neural network 160 along with the merged vectors and the action sequence vectors from the live data set 883 to generate a set of probabilities for all of the items for the new user.

Figure 10:
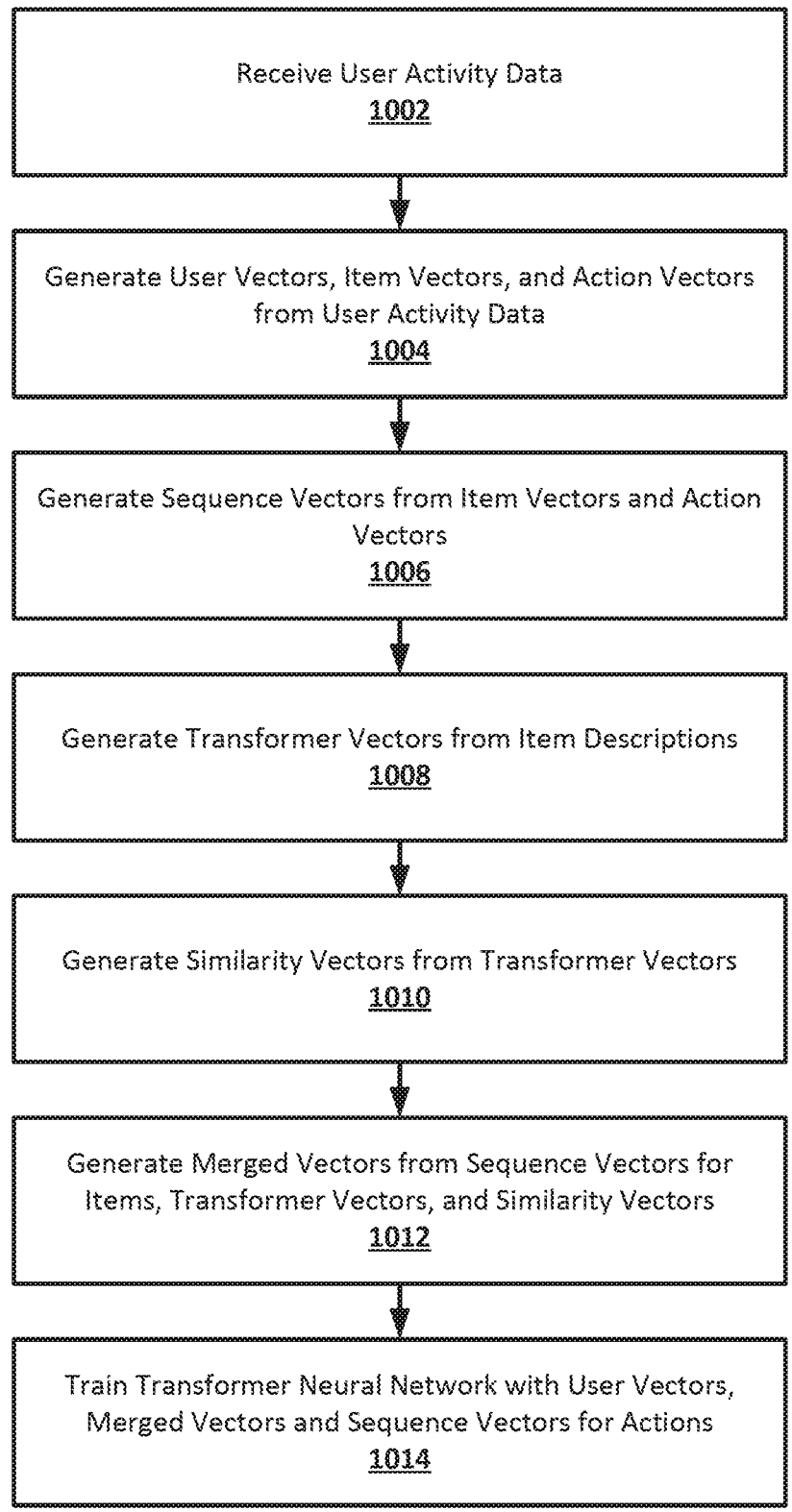
FIG. 10 shows an example procedure suitable for personalized recommendations using a transformer neural network according to an implementation of the disclosed subject matter.

FIG. 10 shows an example procedure suitable for personalized recommendations using a transformer neural network according to an implementation of the disclosed subject matter. At 1002, user activity data may be received. For example, the user activity data 181 may be received at the computing device 100 and stored in the storage 170. The user activity data 181 may be received from any suitable source, including from other components of the computing device 100, or from computing devices or systems other than the computing device 100.

At 1004, user vectors, item vectors, and actions vectors may be generated from user activity data. For example, the user activity data 181 may be input to the singular value decomposer 110. The singular value decomposer 110 may tokenize the user activity data 181, generating a matrix representing the user activity data 181 by counting the items interacted with and actions taken by each user from the user activity data 181. The singular value decomposer 110 may apply a matrix factorization algorithm to the matrix that represents the user activity data 181. The result of matrix factorization may be an inferred user matrix U which may be of dimensions n×K, and activity matrix P which may be of dimensions K×m. The rows of the user matrix U may be user vectors, with one user vector for each user in the user activity data 181. The rows of the activity matrix P for items may be item vectors, and the rows of the activity matrix P for actions may be action vectors, with one item vector for each item and one action vector for each action from the user activity data 181.

At 1006, sequence vectors may be generated from item vectors and action vectors. For example, the item vectors and action vectors generated by the singular value decomposer 110 may be input to the word2vec neural network 120. The word2vec neural network 120 may output a sequence vector for each item and action from the user activity data 181 for which an item vector or action vector was generated. The sequence vectors output by the word2vec neural network may be of any suitable dimension d2.

At 1008, transformer vectors may be generated from item descriptions. For example, the descriptions of the items from the catalog 183 may be input to the text-to-text transferring transformer 130, which may generate a transformer vector for each of the items. The descriptions and images of items from the entries for the item in the catalog 183 may be encoded into the transformer vectors for the items using the text-to-text transferring transformer 130. The transformer vectors may be of any suitable dimension. For example, the transformer vectors output by the text-to-text transferring transformer 130 for each item from the user activity data 181 may have a dimension of 300. The transformer vectors output by the text-to-text transferring transformer 130 may be output to the highway network 150. The transformer vectors may also be output to the similarity vector generator 140, either directly from the text-to-text transferring transformer 130 or from the training data set 182.

At 1010, similarity vectors may be generated from transformer vectors. For example, the similarity vector generator 130 may generate a pairwise similarity matrix based on the transformer vectors generated by the text-to-text transferring transformer 130. The pairwise similarity matrix may be based on the computation of the pairwise distance between all of the transformer vectors. The pairwise similarity matrix may include similarity vectors for each item based on the pairwise distance between the transformer vector for that item, as generated from the description of the item in the catalog 183, and the transformer vectors for all the other items The number of elements in a similarity vector for an item may be large, and may be reduced by taking some number d3, which may be, for example, 50, of the top principal components of the similarity vector, resulting in the similarity vectors all having the dimension d3. The similarity vectors may be output to the highway network 150.

At 1012, merged vectors may be generated from the sequence vectors for item, transformer vectors, and similarity vectors. For example, each item from the user activity data 181 may be represented by a sequence vector generated from the item vector for the item by the word2vec neural network 120, a transformer vector generated by the text-to-text transferring transformer 130, and a similarity vector generated from the transformer vector by the similarity vector generator 140. The sequence vector, transformer vector, and similarity vector for each item may be input to the highway network 150. The highway network 150 may take a portion of each of the sequence vector, transformer vector, and similarity vector for the same item and send them directly to the output of the highway network 150. The remaining portions of sequence vector, transformer vector, and similarity vector for the same item may go through a rectifiable gate of the highway network 150, which may include a number of weighted gates, which may drop out some of the remaining portions, sending non-dropped out portions to the output of the highway network 150. The output of the highway network 150 may be a merged vector for the item that may have any suitable dimension, such as, for example, the same dimension as the sequence vector, and may include portions of the sequence vector, transformer vector, and similarity vector. The highway network 150 may receive as input the sequence vectors, similarity vectors, and transformer vectors, and may generate merged vectors for each item from the user activity data 181 with a sequence vector, similarity vector, and transformer vector. The merged vectors output by the highway network 150 may be stored in the training data set 182.

At 1014, a transformer neural network may be trained with the user vectors, merged vectors, and sequence vectors for actions. For example, the transformer neural network 160 may be a rezero-based transformer neural network that may be initialized to act as an identity function for the input with the layers all being multiplied by a parameters that starts at 0 for each layer. As the rezero-based transformer neural network is trained using the user vectors, merged vectors, and action sequence vectors from the training data set 182, the parameter for each layer may change. The transformer neural network 160 may be trained in any suitable manner, including, for example, through offline supervised learning. During training of the transformer neural network 160, all of the user vectors may be input to the transformer neural network 160 first, before the merged vectors and sequence vectors for the actions are input.

Figure 11:
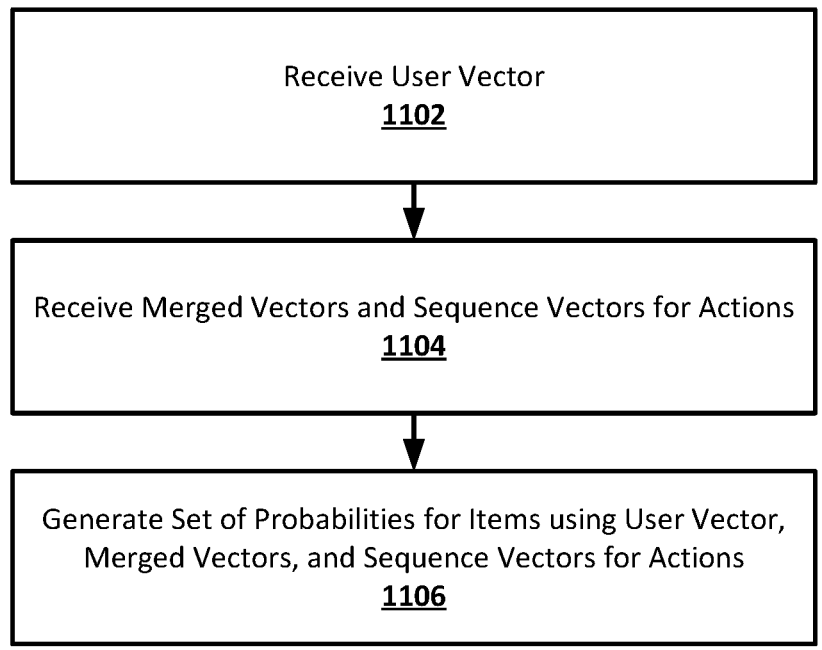
FIG. 11 shows an example procedure suitable for personalized recommendations using a transformer neural network according to an implementation of the disclosed subject matter.

FIG. 11 shows an example procedure suitable for personalized recommendations using a transformer neural network according to an implementation of the disclosed subject matter. At 1102, a user vector may be received. For example, a user vector may be received as input at the transformer neural network 160. The user vector may be for an existing user, and may be received from the live data set 883, or may be for a new user, and may be received after being generated by the user vector generator 910.

At 1104, merged vectors and sequence vectors for action may be received. For example, the merged vectors for items and the sequence vectors for actions may be received from the live data set 883. The merged vectors for items may include merged vectors that were part of the training data set 181 and any other merged vectors generated after the transformer neural network was trained using the training data set 181.

At 1106, a set of probabilities may be generated using the user vector, merged vectors, and sequence vectors for actions. For example, the user vector, merged vectors, and sequence vectors for actions may be input to the transformer neural network 160. The user vector may be input to the transformer neural network first 160, before the merged vectors and sequence vectors for the actions are input. The last layer of the transformed neural network 160 may filter out the probabilities determined for the actions, so that the set of probabilities for the user includes a probability for each item that has a description in the catalog. The probability for an item may indicate the likelihood of the user taking an action in regard to that item if that item is recommended to the user. The set of probabilities may be used in any suitable manner. For example, the set of probabilities may be used to make personalized item recommendations to the user. This may include, for example, generating and sending electronic communications, such as emails and SMS and MMS messages, that recommend the items with the highest probabilities for the user to the user. The items with the highest probabilities for the user may also be displayed to the user as recommendations when the user views a webpage of an online store in which the items are available, and may be included in advertising shown to the user on webpages outside of the online store. The items may be, for example, products or services that may be purchased or otherwise obtained by the user.

Figure 12:
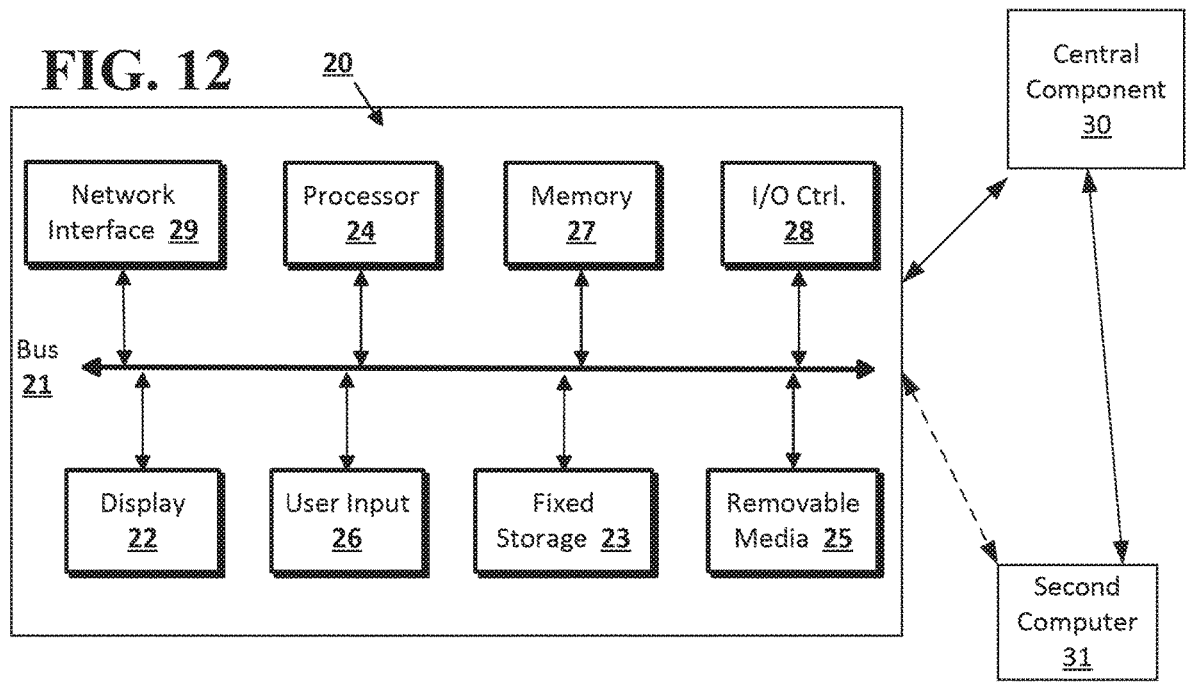
FIG. 12 shows a computer according to an implementation of the disclosed subject matter.

Implementations of the presently disclosed subject matter may be implemented in and used with a variety of component and network architectures. FIG. 12 is an example computer 20 suitable for implementing implementations of the presently disclosed subject matter. As discussed in further detail herein, the computer 20 may be a single computer in a network of multiple computers. As shown in FIG. 12, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 13.

Many other devices or components (not shown) may be connected in a similar manner (e.g., document scanners, digital cameras and so on). Conversely, all of the components shown in FIG. 12 need not be present to practice the present disclosure. The components can be interconnected in different ways from that shown. The operation of a computer such as that shown in FIG. 12 is readily known in the art and is not discussed in detail in this application. Code to implement the present disclosure can be stored in computer-readable storage media such as one or more of the memory 27, fixed storage 23, removable media 25, or on a remote storage location.

Figure 13:
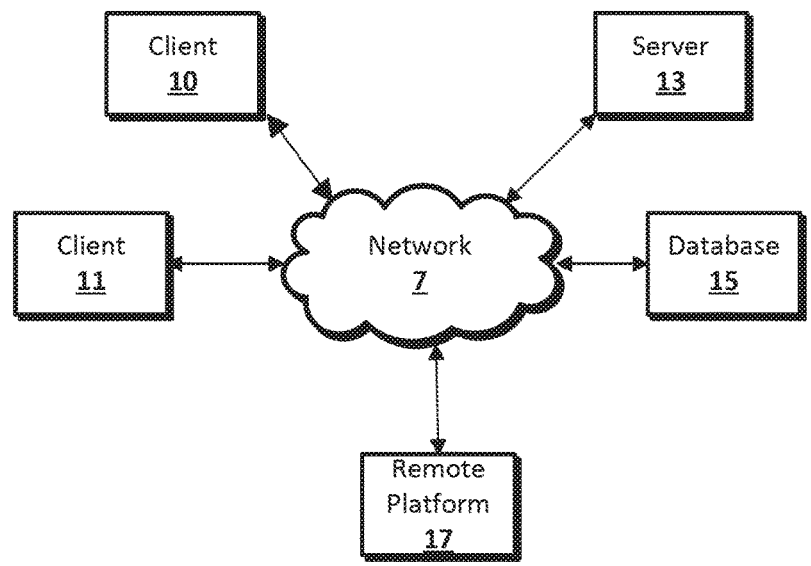
FIG. 13 shows a network configuration according to an implementation of the disclosed subject matter.

FIG. 13 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving, at a computing device, user activity data comprising items and actions associated with users and a catalog comprising descriptions of the items;
generating, by the computing device, a user vector for each of the users, an item vector for each item and an action vector for each action associated with the users by applying singular vector decomposition to the user activity data;

generating, by the computing device, a sequence vector for each of the items and each of the actions based on the item vectors and the action vectors;

generating, by the computing device, a transformer vector for each of the items by applying a text-to-text transferring transformer to the description of the item from the catalog;

generating, by the computing device, a similarity vector for each of the items based on the transformer vectors for the items;

generating, by the computing device, a merged vector for each of the items by merging the sequence vector, transformer vector, and similarity vector for the item; and determining, by the computing device, a set of probabilities for at least one user by inputting the user vector for the at least one user, merged vectors for each of the items, and sequence vectors for each of the actions to a transformer neural network, wherein the set of probabilities for the at least one user comprises a probability for each item with a description in the catalog.

2. The computer-implemented method of claim 1, further comprising generating a user vector for a new user with no associated user activity data based on an average of the user vectors generated from the user activity data using singular value decomposition.

3. The computer-implemented method of claim 1, further comprising:
receiving additional user activity data for a new user; and
generating a user vector for the new user based on a user-to-user similarity comparison between the additional user activity data for the new user and the user activity data used to generate the user vectors.

4. The computer-implemented method of claim 1, wherein generating a sequence vector for each of the items based on sequence data from the user activity data further comprises inputting the sequence data to a word2vec neural network.

5. The computer-implemented method of claim 1, wherein generating a similarity vector for each of the items based on the transformer vectors for the items further comprises determining a pairwise similarity matrix for the transformer vectors for the items.

6. The computer-implemented method of claim 1, wherein generating a merged vector for each of the items by merging the sequence vector, transformer vector, and similarity vector for the item further comprises inputting the sequence vector, transformer vector, and similarity vector for each item to a highway network.

7. The computer-implemented method of claim 1, wherein the items are products in an online store.

8. The computer-implemented method of claim 1, further comprising generating at least one electronic communication comprising a recommendation to the at least one user of the item with the highest probability in the set of probabilities.

9. A computer-implemented system for personalized recommendations using a transformer neural network comprising:
one or more storage devices; and
a processor that receives user activity data comprising items and actions associated with users and a catalog comprising descriptions of the items, generates a user vector for each of the users, an item vector for each item and an action vector for each action associated with the users by applying singular vector decomposition to the user activity data, generates a sequence vector for each of the items and each of the actions based on the item vectors and the action vector, generates a transformer vector for each of the items by applying a text-to-text transferring transformer to the description of the item from the catalog, generates a similarity vector for each of the items based on the transformer vectors for the items, generates a merged vector for each of the items by merging the sequence vector, transformer vector, and similarity vector for the item, and determines a set of probabilities for at least one user by inputting the user vector for the at least one user, merged vectors for each of the items, and sequence vectors for each of the actions to a transformer neural network, wherein the set of probabilities for the at least one user comprises a probability for each item with a description in the catalog.

10. The computer-implemented system of claim 9, wherein the processor further generates a user vector for a new user with no associated user activity data based on an average of the user vectors generated from the user activity data using singular value decomposition.

11. The computer-implemented system of claim 9, wherein the processor further receives additional user activity data for a new user and generates a user vector for the new user based on a user-to-user similarity comparison between the additional user activity data for the new user and the user activity data used to generate the user vectors.

12. The computer-implemented system of claim 9, wherein the processor further generates a sequence vector for each of the items based on sequence data from the user activity data further comprises inputting the sequence data to a word2vec neural network.

13. The computer-implemented system of claim 9, wherein the processor further generates a similarity vector for each of the items based on the transformer vectors for the items by determining a pairwise similarity matrix for the transformer vectors for the items.

14. The computer-implemented system of claim 9, wherein the processor further generates a merged vector for each of the items by merging the sequence vector, transformer vector, and similarity vector for the item further by inputting the sequence vector, transformer vector, and similarity vector for each item to a highway network.

15. The computer-implemented system of claim 9, wherein the items are products in an online store.

16. The computer-implemented system of claim 9, further comprising generating at least one electronic communication comprising a recommendation to the at least one user of the item with the highest probability in the set of probabilities.

17. A system comprising: one or more computers and one or more storage devices storing instructions which are operable, when executed by the one or more computers, to cause the one or more computers to perform operations comprising:
receiving, at a computing device, user activity data comprising items and actions associated with users and a catalog comprising descriptions of the items;
generating, by the computing device, a user vector for each of the users, an item vector for each item and an action vector for each action associated with the users by applying singular vector decomposition to the user activity data;
generating, by the computing device, a sequence vector for each of the items and each of the actions based on the item vectors and the action vectors;

generating, by the computing device, a transformer vector for each of the items by applying a text-to-text transferring transformer to the description of the item from the catalog;

generating, by the computing device, a similarity vector for each of the items based on the transformer vectors for the items;

generating, by the computing device, a merged vector for each of the items by merging the sequence vector, transformer vector, and similarity vector for the item; and determining, by the computing device, a set of probabilities for at least one user by inputting the user vector for the at least one user, merged vectors for each of the items, and sequence vectors for each of the actions to a transformer neural network, wherein the set of probabilities for the at least one user comprises a probability for each item with a description in the catalog.

18. The system of claim 17, wherein the instructions further cause the one or more computers to perform operations further comprising generating a user vector for a new user with no associated user activity data based on an average of the user vectors generated from the user activity data using singular value decomposition.

19. The system of claim 17, wherein the instructions further cause the one or more computers to perform operations further comprising:

receiving additional user activity data for a new user; and generating a user vector for the new user based on a user-to-user similarity comparison between the additional user activity data for the new user and the user activity data used to generate the user vectors.

20. The system of claim 17, wherein the instructions further cause the one or more computers to perform operations further comprising generating at least one electronic communication comprising a recommendation to the at least one user of the item with the highest probability in the set of probabilities.

* * * * *